(12) United States Patent
Carrender

(10) Patent No.: US 10,004,347 B1
(45) Date of Patent: Jun. 26, 2018

(54) ELECTRICALLY CONDUCTIVE FLASKLIGHT

(71) Applicant: Charlton Carrender, Ridgecrest, CA (US)

(72) Inventor: Charlton Carrender, Ridgecrest, CA (US)

( * ) Notice: Subject to any disclaimer, the term of this patent is extended or adjusted under 35 U.S.C. 154(b) by 0 days. days.

(21) Appl. No.: 15/695,623

(22) Filed: Sep. 5, 2017

(51) Int. Cl.
| F21L 4/04 | (2006.01) |
| A47G 19/22 | (2006.01) |
| F21L 4/02 | (2006.01) |
| F21V 33/00 | (2006.01) |
| F21V 23/04 | (2006.01) |
| H01H 13/64 | (2006.01) |
| F21V 14/04 | (2006.01) |
| F21V 21/40 | (2006.01) |
| F21Y 115/10 | (2016.01) |

(52) U.S. Cl.
CPC .......... *A47G 19/2227* (2013.01); *F21L 4/027* (2013.01); *F21V 14/045* (2013.01); *F21V 21/406* (2013.01); *F21V 23/0421* (2013.01); *F21V 33/0004* (2013.01); *H01H 13/64* (2013.01); *A47G 2019/2238* (2013.01); *F21Y 2115/10* (2016.08)

(58) Field of Classification Search
CPC . A47G 19/2227; A47G 19/2238; F21L 4/027; F21V 14/025; F21V 14/045; F21V 14/065; F21V 14/085; F21V 21/406; F21V 23/04–23/06; F21V 33/0004; H01H 13/64
USPC .................................. 362/101, 183–208, 253
See application file for complete search history.

(56) References Cited

U.S. PATENT DOCUMENTS

| 1,884,108 | A | 10/1932 | Moran |
| 2,737,574 | A | 3/1956 | Muller |
| 5,345,370 | A | 9/1994 | Murray et al. |
| 7,540,625 | B2 | 6/2009 | Matthews et al. |
| 2008/0025018 | A1 | 1/2008 | Sandy |

OTHER PUBLICATIONS

VSSL Flask Light, Kickstarter.

*Primary Examiner* — Jason Moon Han
(74) *Attorney, Agent, or Firm* — Luis Figarella

(57) ABSTRACT

An electric powered flashlight configured so that one or more of the battery cells designed to fit within it may be replaced by a fluid carrying vessel that is electrically conducive so that in addition to carrying fluids internally it may be part of the energy transmission circuit within said flashlight. One or both ends of said vessel may have a removable drinking cap.

7 Claims, 3 Drawing Sheets

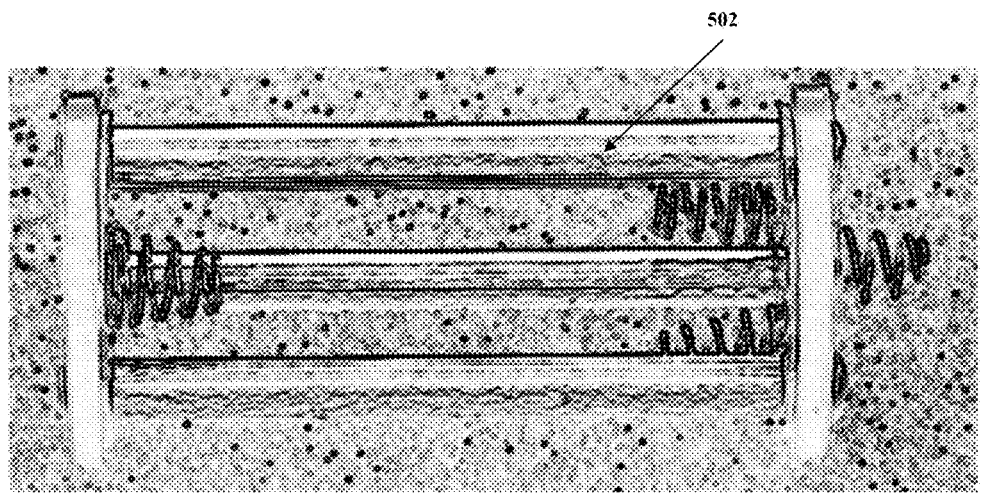
Figure 5
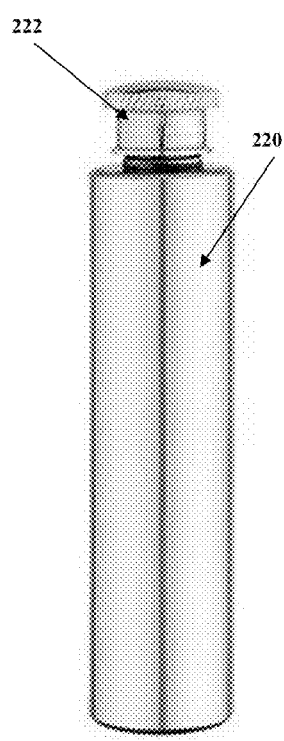
← Figure 6
Figure 7 →
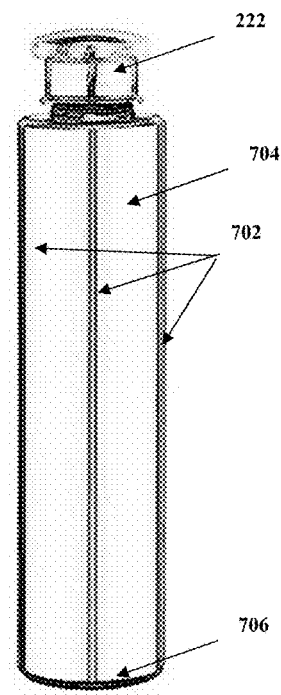

ELECTRICALLY CONDUCTIVE FLASKLIGHT

PATENTS CITED

The following documents and references are incorporated by reference in their entirety, Moran (U.S. Pat. No. 1,884,108), Muller (U.S. Pat. No. 2,737,574), Murray et al (U.S. Pat. No. 5,345,370), Matthews et al (U.S. Pat. No. 7,540,625) and Sandy (US Pat. Pub. No. 2008/0025018).

FIELD OF THE INVENTION

This invention relates to flashlights, and more particularly to flashlights having internal liquid carrying vessels that are part of the energy transmission circuit within said flashlight.

DESCRIPTION OF THE RELATED ART

Handheld flashlights are known in the prior art. In recent times, they have become smaller and much more portable thanks to the advent of Light Emitting Diodes (LED) illuminators, which can provide similar illumination to incandescent bulbs using significantly less energy. While this has resulted in the smaller flashlights, in many cases the ergonomics and alternate uses of flashlights has resulted in some users continuing to use their 'older' and 'larger' units.

The above provides a significant new opportunity, keep the traditional sized flashlight, replace the light source for an LED one, and then in one or more of the traditional 'C' or 'D' sized cells with in that in the case of the traditional The above is true with multiple light emitters including incandescent light bulbs and light emitting diodes. Such flashlights permit a user to perform tasks under portable light conditions selected for the particular task. Nevertheless, the need exists for improvements in such flashlights for increasing their adaptability to varied environments and purposes.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

In one aspect, the invention is about a flashlight comprising a light source, one or more power sources, an ON/OFF switch, an electronic controller connected to each of the power storage element, the lamp, and the switch and an electrically conductive fluid flask and flask end cap forming part of the light source power circuit. In another aspect, said fluid flask and fluid flask cap are primarily made of metal. In yet another aspect, the flashlight includes a tail cap screwed tightly to the flashlight body during normal operation. In one aspect, the flashlight includes a tail cap and the switch is mounted on the tail cap. In another aspect, said fluid flask is made primarily of electrically non-conductive material having one or more conductive elements placed along said flask length, electrically connecting said flask bottom to said flask fluid flask cap primarily made of metal.

Other features and advantages of the present invention will become apparent upon examining the following detailed description of an embodiment thereof, taken in conjunction with the attached drawings.

BRIEF DESCRIPTION OF THE DRAWINGS

FIGS. 4 and 5 illustrate the proposed power pack, according to exemplary embodiments of the invention.

FIGS. 6 and 7 illustrate the proposed flask component(s), according to exemplary embodiments of the invention.

Figure 1:
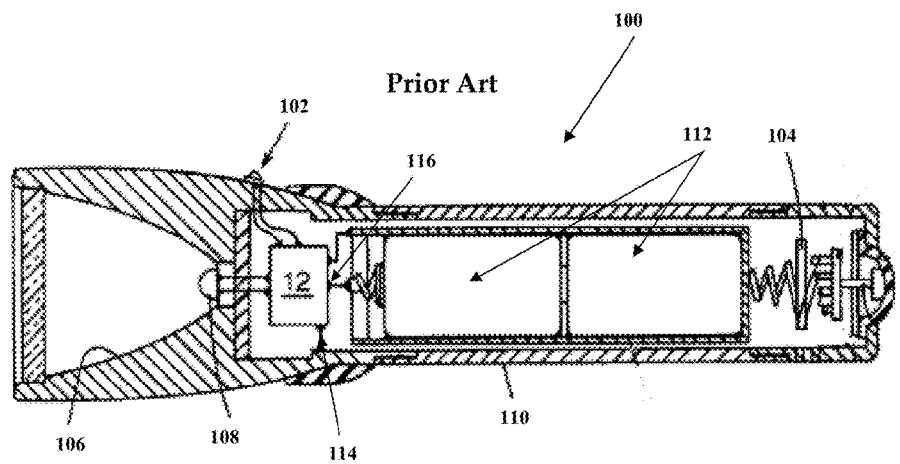
FIG. 1 shows an illustration of the existing flashlight prior art.

The above-described and other features will be appreciated and understood by those skilled in the art from the following detailed description, drawings, and appended claims.

DETAILED DESCRIPTION OF THE PREFERRED EMBODIMENT

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

Simplifications or omissions may be made to avoid obscuring the purpose of the section. Such simplifications or omissions are not intended to limit the scope of the present invention. All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

As used in the specification and claims, the singular forms "a", "an" and "the" include plural references unless the context clearly dictates otherwise. For example, the term "a transaction" may include a plurality of transaction unless the context clearly dictates otherwise. As used in the specification and claims, singular names or types referenced include variations within the family of said name unless the context clearly dictates otherwise.

Certain terminology is used in the following description for convenience only and is not limiting. The words "lower," "upper," "bottom," "top," "front," "back," "left," "right" and "sides" designate directions in the drawings to which reference is made, but are not limiting with respect to the orientation in which the modules or any assembly of them may be used.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Referring to FIG. 1, we see a prior art image of a battery powered flashlight 100, very useful to learn about its basic components. An ON/OFF switch 102 is typically placed near the front or near end, although it may also be placed in any convenient location (such as the distal end, say tail or cap), as long as said switch 102 interrupts the electrical circuit energizing the where the illumination source 108 and reflector assembly 106 are located. The illumination source 108 has traditionally been incandescent, but in modern times it is usually a Light Emitting Diode (LED). The elongated shape of the unit is well suited to be held in a human hand, usually of circular cross section to accommodate the power cells 112.

The power cells 112 are laid in series within the inside of the flashlight 100, so that they are Positive (+) to Negative (−), creating the voltage required to power the illumination source 108. This is accomplished by the ON/OFF closing the circuit that places the Pos (+) 116 to the Neg (−) end 114 (or ground), which is usually made to ensure electrical circuit connection by the mechanical pressing 104 (via spring, or tight tolerances) located at the distal end. This ensures that when the ON/OFF 102 switch is 'closed', the current flows from the POS (−) through the illumination source 108, to the ground or lowest point 104, via either the body 110 or similar electrical transmission.

As mentioned above, the availability of LED light sources 108 has transformed flashlights. In effect, the higher efficiency allows similar brightness and battery lifetime using much smaller cells. Of course in many cases, this has resulted in smaller flashlights. However, as happened in cell phones (with the distance between ear and mouth), certain human dimensions are not shrinking. In a similar fashion, certain professions prefer keeping the flashlight around the 'C' or 'D' battery cell dimensions.

Figure 2:
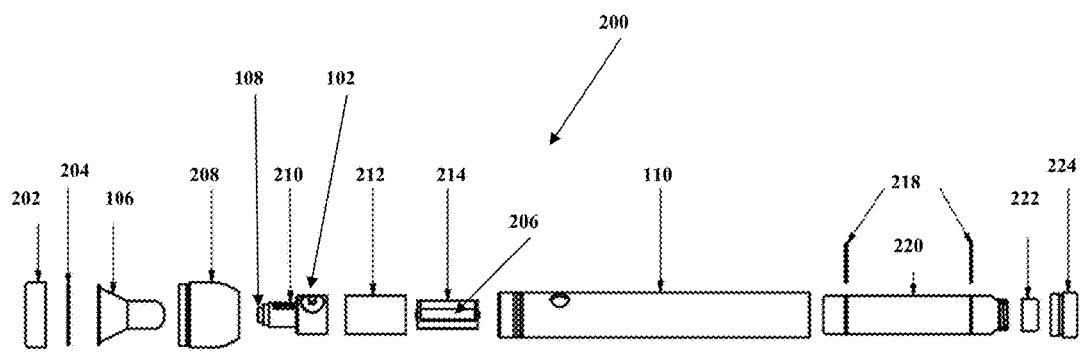
FIG. 2 illustrates the components of the new proposed "FLASKLIGHT", according to an exemplary embodiment of the invention.
Figure 3:
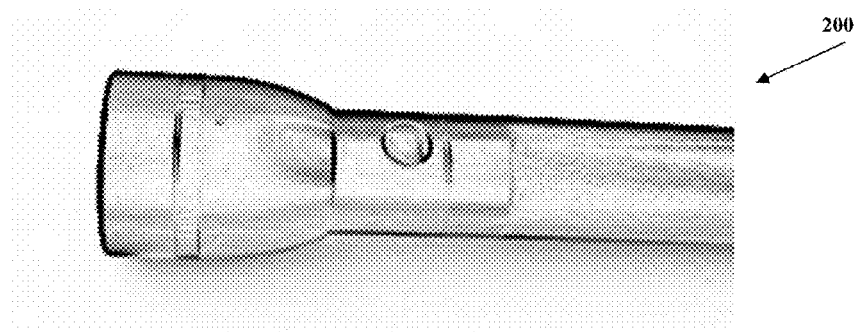
FIG. 3 shows the outside of the proposed "FLASKLIGHT", according to an exemplary embodiment of the invention.

FIGS. 2-3 illustrates one of the proposed embodiments, one where the above advantages are used to mfr. a 'FLASKLIGHT' 200, a flashlight where one or more of the battery cells are replaced with an electrically conductive flask designed to hold the user's fluid of choice. As seen, the proposed 'FLASKLIGHT' 200 is comprised of an elongated shape 110, preferably tubular/cylindrical, but any suitable shape may be used, having an illumination source 108 at a near end, the complete illumination assembly comprised of a face cap 202, lens 204 (may be clear or suitable tinted), reflector housing 106, the flashlight head 208, an illumination source 108, switch 102, switch assembly 210, an optional spacer sleeve 212 (complementary to the flask 220), a power source 214 (having one or more battery cells 206), the 'FLASKLIGHT' body housing 110, flask 220, optional flask O-rings 218, the flask end cap 222 and the flashlight body end cap 224. The flask end cap 222 is designed attach to the flask 220, and ensure the seal is strong so there is no leakage from the fluid contained within the flask 220.

Figure 4:
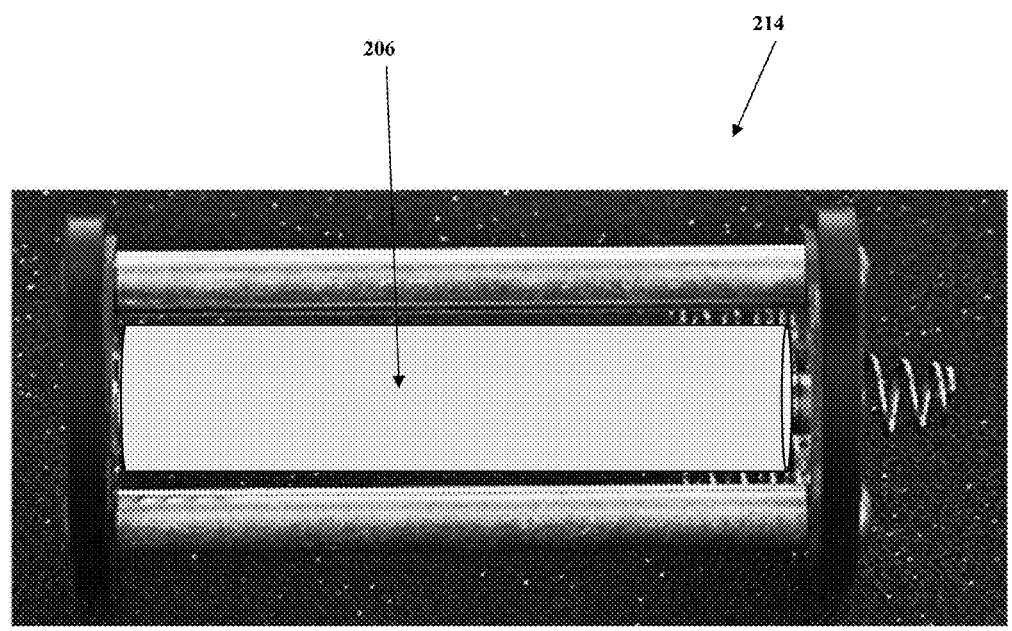

As seen in FIGS. 4-5, the one or more power sources 214 comprise the primary energy source for the 'FLASKLIGHT' 200. These may be comprised of one or more battery cells (be they AA, AAA, C or D sized) either by themselves 206 or in cycled packs having two or more (typically three) cells connected in an electrical circuit around a carrier 502, typically AA or AAA cells occupying the volume a single 'D' or 'C' cell would occupy. In this fashion, the voltage and energy required for the LED 108 are supplied.

Of course, simply having the power source would not be enough in the larger unit 110, because the empty space would preclude the circuit from being closed. This is accomplished by providing an electrically conductive fluid flask 220 and flask end cap 222. When placed within the 'FLASKLIGHT' 200 body housing 110, the flask/cap 220/222 become the bottom portion of the circuit. In one embodiment, a electrically non-conductive material flask 704 may be used, as long as one or more electrically conductive 702 edges or strings are attached around said non-conductive portion, allowing for an electrical path from the bottom 706 of the flask to the flask top 222, in this fashion the electrical circuit is completed between the power source 214 and the flask/cap 220/224 or 702/222 through the switch 102 to the light source 108.

CONCLUSION

In concluding the detailed description, it should be noted that it would be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

The invention claimed is:

1. A flashlight comprising:
a light source;
one or more power sources;
an ON/OFF switch;
an electronic controller connected to each of the one or more power sources, the light source, and the switch; and
an electrically conductive fluid flask and flask end cap forming part of a light source power circuit.

2. The flashlight of claim 1 wherein:
said fluid flask and fluid flask cap are primarily made of metal.

3. The flashlight of claim 2 wherein:
the flashlight includes a tail cap screwed tightly to the flashlight body during normal operation.

4. The flashlight of claim 2 wherein:
the flashlight includes a tail cap and the switch is mounted on the tail cap.

5. The flashlight of claim 1 wherein:
said fluid flask is made primarily of electrically non-conductive material having one or more conductive elements placed along said flask length, electrically connecting said flask bottom to said flask fluid flask cap primarily made of metal.

6. The flashlight of claim 5 wherein:
the flashlight includes a tail cap screwed tightly to the flashlight body during normal operation.

7. The flashlight of claim 5 wherein:
the flashlight includes a tail cap and the switch is mounted on the tail cap.

* * * * *